(12) United States Patent
Friedmann

(10) Patent No.: US 6,277,043 B1
(45) Date of Patent: Aug. 21, 2001

(54) TORQUE MONITORING SENSOR WITH WEAR REDUCTION ELEMENTS

(75) Inventor: Oswald Friedmann, Lichtenau/Ulm (DE)

(73) Assignee: Luk Lamellen und Kupplungsbau GmbH (DE)

( * ) Notice: Subject to any disclaimer, the term of this patent is extended or adjusted under 35 U.S.C. 154(b) by 0 days.

(21) Appl. No.: 09/512,485

(22) Filed: Feb. 23, 2000

(30) Foreign Application Priority Data

Feb. 24, 1999 (DE) .............................................. 199 07 816

(51) Int. Cl.[7] .................................................. F16H 55/56
(52) U.S. Cl. .............................................................. 474/18
(58) Field of Search ................................. 474/18, 28, 70, 474/69

(56) References Cited

U.S. PATENT DOCUMENTS

| 5,169,365 | 12/1992 | Friedmann | 474/18 |
| 5,295,915 | * 3/1994 | Friedmann | 474/18 |
| 5,725,447 | 3/1998 | Friedmann et al. | 474/18 |
| 5,879,253 | 3/1999 | Friedmann et al. | 478/18 |
| 6,190,274 | * 1/2001 | Walter | 474/28 |

FOREIGN PATENT DOCUMENTS

10007991 A1 * 8/2000 (DE) .

* cited by examiner

*Primary Examiner*—Dirk Wright
(74) *Attorney, Agent, or Firm*—Alfred J. Mangels

(57) ABSTRACT

An improved torque monitoring sensor for an infinitely variable transmission including integrated wear reduction elements designed to minimize the hysteresis associated with physical strains, axial thrust forces, and mechanical friction introduced into components of the torque monitoring sensor during operation is disclosed. In one embodiment the present wear reduction elements include the formation of a symmetrical pattern of elongated slots in the cylindrical sheet metal housing of an axially displaceable cam disc component in the torque monitoring sensor to provide a degree of structural flexibility to the housing. So modified, the cam disc housing undergoes flexion in response to micro-movements generated by abrupt changes in the torque transmitted. The cam disc housing resiliently absorbs such detrimental micro-movements to prevent mechanical transference of such movement into premature frictional wear and corrosion of axially displaceable, mating splines and other components of the torque monitoring sensor. In an alternative embodiment such hysteresis is minimized by the installation of spring elements, which are interposed between the axially displaceable cam disc housing and the mating components thereof, to resiliently absorb such axial micro-movements in the torque transmitting apparatus.

17 Claims, 4 Drawing Sheets

TORQUE MONITORING SENSOR WITH WEAR REDUCTION ELEMENTS

CROSS-REFERENCE TO RELATED APPLICATION

This Application claims foreign priority benefits under 35 U.S.C. § 119(a)–(d) to German patent application 199 07 816.5, filed Feb. 24, 1999 by inventor, Oswald Friedmann, for an invention entitled, "Getriebe" (Transmission).

BACKGROUND OF THE INVENTION

Field of Invention

This invention relates to improvements in power trains of the type wherein the means for transmitting torque from the rotary output element of a primary power source (such as an internal combustion engine) to a rotary driven element (such as the output shaft of an infinitely variable speed transmission) comprises a torque monitoring sensor integrated with such transmission, in which an endless flexible element (such as a belt or chain) is trained over a pair of adjustable pulleys or sheaves. Each pair of sheaves is adjustable by the torque sensor in response to abrupt changes in the transmitted torque to vary the transmission ratio. More particularly, the present invention relates to the integration of wear reduction elements into such a torque monitoring sensor, which function to minimize the hysteresis associated with physical strains introduced into the torque transmitting apparatus in response to abrupt changes in the load or in the torque being transmitted.

DESCRIPTION OF RELATED PRIOR ART

An infinitely variable ratio transmission, which can be utilized in conjunction with the improved torque sensor of the present invention is disclosed in U.S. Pat. No. 5,169,365 to Friedmann and is incorporated herein by reference. The disclosure in U.S. Pat. No. 5,879,253 entitled: "Torque Monitoring Apparatus", filed Nov. 26, 1997 by inventors, Oswald Friedmann and Armin Veil, is hereby incorporated herein by this reference; and the disclosure in U.S. Pat. No. 5,725,447 entitled: "Power Train with Infinitely Variable Ratio Transmission", filed Dec. 14, 1995, by inventors, Oswald Friedmann, Urban Panther, and Ivo Agner, is also hereby incorporated herein by this reference. The torque sensors, which are disclosed in these prior patents, are designed to establish a clamping engagement between component parts of a torque transmitting apparatus depending upon the load or depending upon the transmitted torque. As a rule such torque sensors are designed to ensure a frictional engagement between component parts, which are urged against or toward each other by a force depending upon the transmitted loads or upon the transmitted torque, in such a way that the force acting to urge the component parts into frictional engagement with one another at least approximates the force, which is necessary for the transmission of torque. The application of an excessive force for urging the component parts against each other results in excessive wear whereas the application of an insufficient force entails a slip and hence again excessive wear between the parts which are maintained in frictional engagement with one another.

A conventional torque monitoring sensor includes a valve whose operation depends upon the magnitude of transmitted torque. Those portions of the torque sensor which are located downstream of a plenum chamber are constructed and assembled to comprise the aforementioned valve and the plenum chamber receives pressurized hydraulic fluid from a suitable pump. The valve acts as a flow restrictor or throttle, which seals the path for the flow of fluid from the plenum chamber so that the pressure of fluid in the plenum chamber increases in response to abrupt increases or peaks of transmitted torque. This results in a corresponding rise of fluid pressure in the plenum chamber as well as in the cylinder chamber or chambers of one or more piston and cylinder units. The piston and cylinder units are provided to adjust the infinitely variable transmission including a pair of adjustable tapered discs or sheaves and an endless flexible element, which is trained over and serves to transmit torque between the adjustable sheaves. The flexible element may constitute either a belt or a chain.

An increase in pressure in the cylinder chamber or chambers brings about a corresponding increase of the clamping force between the endless flexible element and the sheave or sheaves of the transmission. In other words, the frictional engagement between the sheave or sheaves on the one hand and the flexible element on the other hand increases in response to an increase of the transmitted torque and/or in response to the development of an abrupt increase of transmitted torque.

In order to adjust the above-described valve, the torque monitoring sensor includes so-called cam discs that are provided with confronting cam faces or ramps bearing upon spherical rolling elements, which are retained between them with a force generated by the source of pressurized hydraulic fluid. If the transmitted torque develops abrupt increases or peaks, especially peaks in the torque being transmitted from the primary power source, the cam discs are caused to move axially and away from each other such that an axially movable portion reduces the effective cross-sectional area of the outlet for the flow of hydraulic fluid from the plenum chamber at a rate proportional to the magnitude of the peaks of transmitted torque.

In addition, the cam discs serve as a means for mechanically transmitting at least a portion of the driving torque to adjust the effective cross-sectional area of the outlet from the plenum chamber as a function of the magnitude of transmitted torque. Thus, the proper frictional clamping force between the adjustable sheaves and the endless flexible element of the infinitely variable transmission is maintained.

This so-called pumping action in the torque sensor introduces severe physical strains and high axial thrust forces and on the rotating and axially displaceable components in the torque sensor, which can cause premature wear of such components and mechanical failure of the torque transmitting apparatus. Thus, the present invention provides wear reduction elements which are integrated into these components of the torque sensor to minimize the hysteresis produced by the pumping action of the torque monitoring sensor in normal operation.

SUMMARY OF THE INVENTION

Accordingly, the present invention is an improved torque sensor for an infinitely variable ratio transmission, which includes wear reduction elements integrated into components of the torque sensor or, in the alternative, wear reduction elements mechanically adaptable to such components. The present wear reduction elements are designed to elastically compensate for the physical strains, axial thrust forces and mechanical friction, which are introduced to the rotating and axially displaceable components of the torque sensor during the so-called pumping action of the torque sensor in response to abrupt changes in the load or torque being transmitted in normal operation.

In one embodiment the present wear reduction elements include the formation of a symmetrical pattern of circumferentially arranged slots in the cylindrical sheet metal housing of an axially displaceable cam disc component to provide a degree of structural flexibility to the housing. So modified, the cam disc housing undergoes slight flexion in response to micro-movements produced by physical strain and/or axial thrust in the supporting bearings to prevent translation of such micro-movements into premature frictional wear of axially displaceable splines and other components in the torque transmitting apparatus.

In an alternative embodiment such physical strains and/or axial micro-movements between torque sensor components are compensated for by the installation of spring elements, which are disposed between the axially displaceable cam disc and the mating components thereof to resiliently absorb such movements in the torque monitoring sensor.

In view of the above it is an object of the present invention to provide an improved torque monitoring sensor for an infinitely variable transmission incorporating wear reduction elements for minimizing the hysteresis associated with physical strains and/or axial thrust movements introduced into the torque sensor during normal operation.

Another object of the present invention is to provide an improved torque monitoring sensor including wear reduction elements for reducing undesirable micro-movements between mating components such as axially displaceable splines in the torque sensor, which are generated by the physical strains, axial thrust forces, and mechanical friction resulting from abrupt changes in the load and/or the torque transmitted during normal operation.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENT

Prior to describing the improvements of the present torque monitoring sensor in detail, it may be beneficial to review the structure and function of an infinitely variable speed transmission with which the present invention is to be utilized. For purposes of this application it will be understood that the terminology "variable speed transmission," "infinitely variable transmission," and "infinitely variable speed transmission" are considered to be substantially identical and interchangeable terms.

Figure 1:
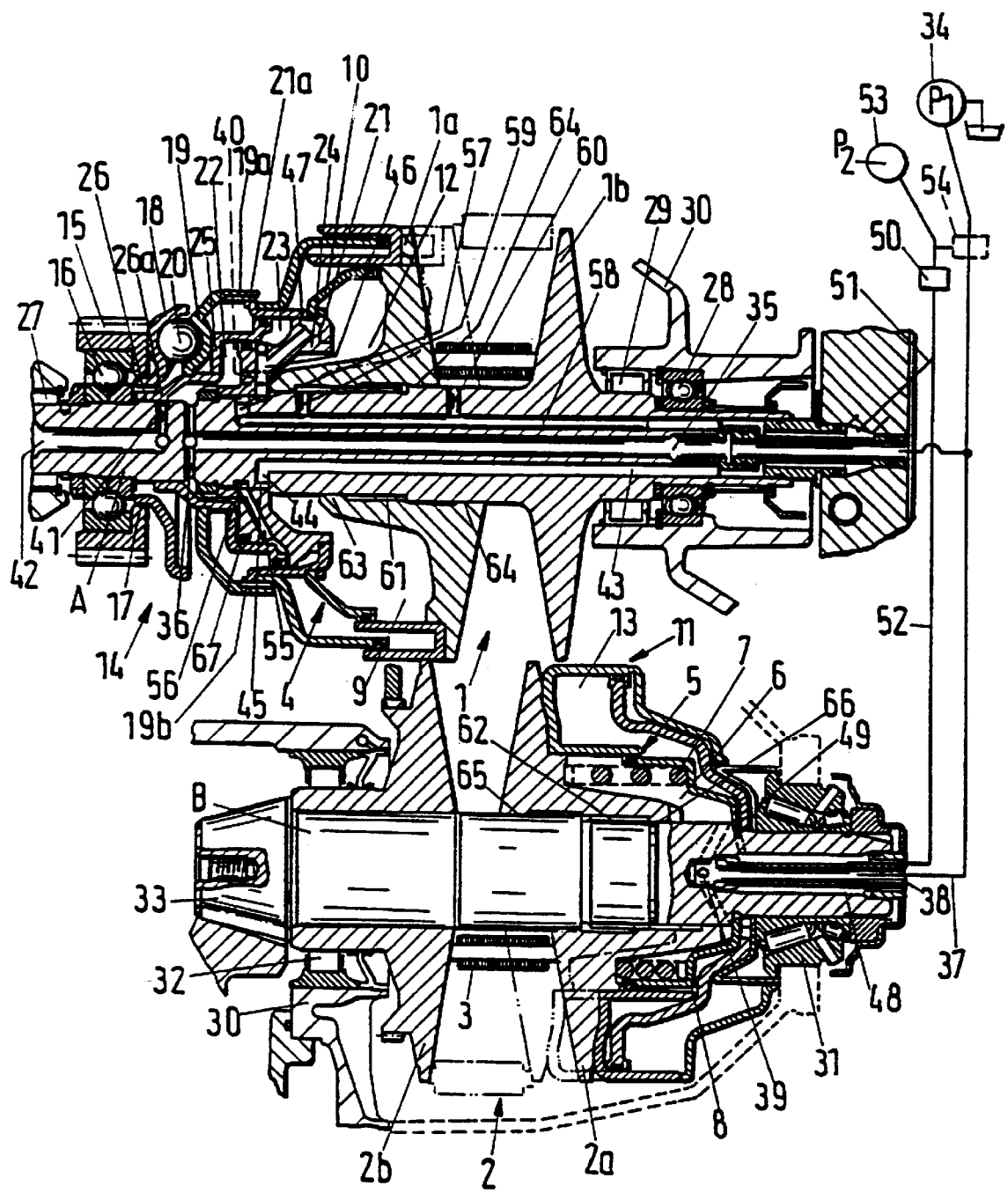
FIG. 1 is an axial section view of an infinitely variable transmission of the PRIOR ART wherein the improvements of the present invention are to be utilized.
Figure 1A:
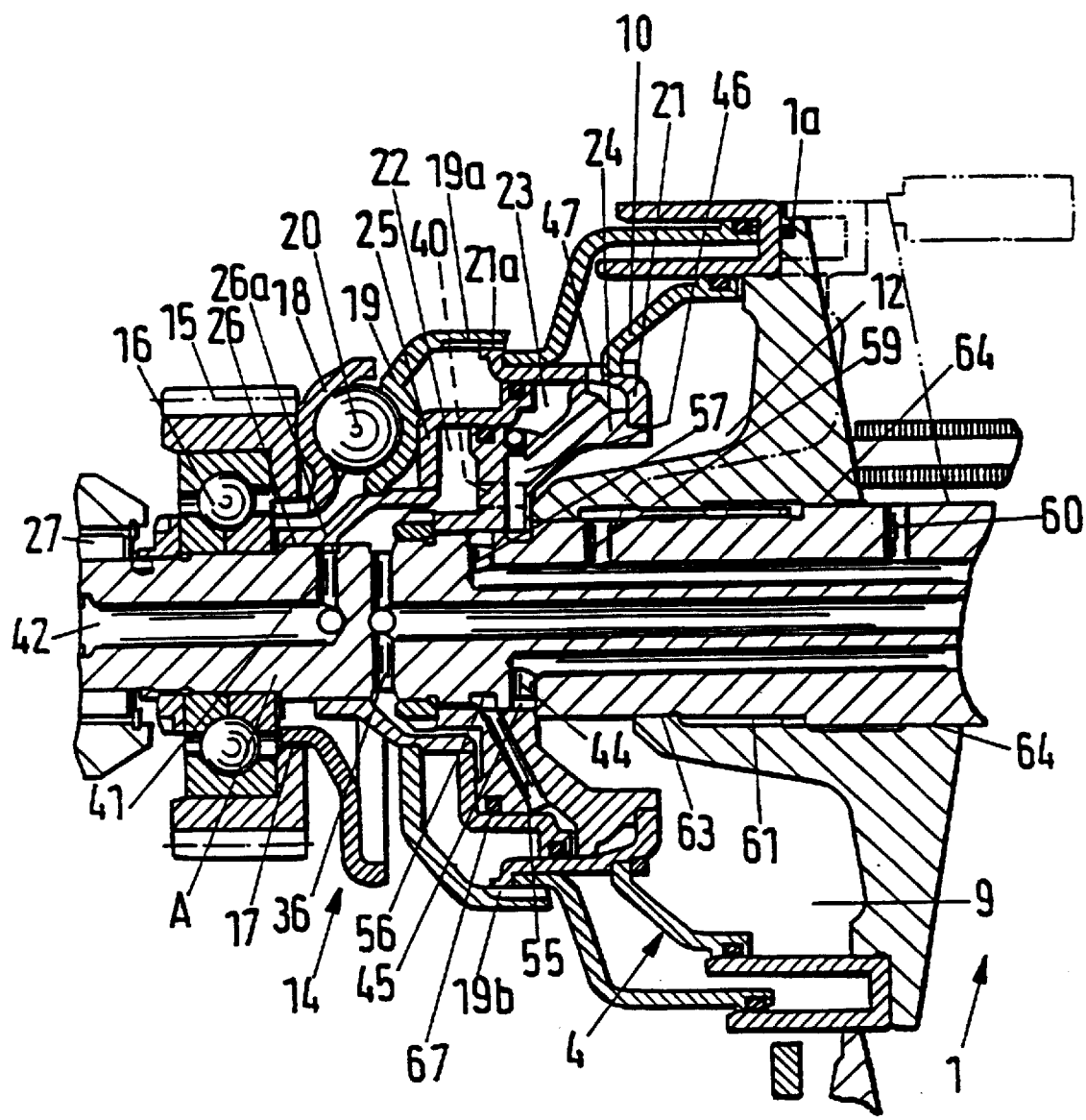
FIG. 1A is an enlarged sectional view of the PRIOR ART transmission of FIG. 1 showing details of the torque sensor and the piston and cylinder assemblies positioned on the driven shaft A.

Referring to FIGS. 1 and 1A, there is shown an infinitely variable transmission labeled PRIOR ART including a first adjustable sheave, indicated generally at 1, a second adjustable sheave, indicated generally at 2 and an endless flexible element 3, which is trained over and transmits torque between the sheaves 1 and 2. The sheave 1 is non-rotatably carried by a rotary input member depicted herein as shaft A, which is parallel to a rotary output member comprising a shaft B, which supports and is non-rotatably connected with the sheave 2. The sheaves 1 and 2 are comprised of axially movable first flanges 1*a* and 2*a* and axially fixed second flanges 1*b*, 2*b* respectively.

The flange 1*a* is located at a maximum distance from the flange 1*b* (as shown by solid lines in the upper part of the sheave 1) and the flange 2*a* is located at a minimum axial distance from the flange 2*b* (as shown by solid lines in the upper half of the sheave 2 when the ratio of the infinitely variable transmission including the sheaves 1, 2 and the flexible element 3 assumes a minimum value). The transmission then functions in an underdrive mode wherein the revolutions per minute (RPM) of the shaft A can greatly exceed the RPM of the shaft B. Alternatively, if the axially movable flange 1*a* is caused to move to a position at a minimum axial distance from the axially fixed flange 1*b* (as shown by solid lines in the lower half of the sheave 1), the flange 2*a* is located at a maximum axial distance from the flange 2*b* (as shown in the lower half of the sheave 2) and the transmission functions in an overdrive mode because the RPM of the sheave 2 and shaft B exceeds the RPM of the sheave 1 and shaft A by a maximum value.

The means for adjusting the sheave 1 (i.e. for moving the flange 1*a* axially and relative to the flange 1*b* comprises a hydraulically operated, primary piston and cylinder assembly, indicated generally at 4. Similarly, the means for adjusting the sheave 2 (by moving the flange 2*a* axially and relative to the flange 2*b*) comprises a hydraulically operated, primary piston and cylinder assembly, indicated generally at 5. The chamber 6 of the piston and cylinder assembly 5 includes at least one energy storing element depicted herein as a coil spring 7, which biases the axially movable flange 2*a* in a direction toward the axially fixed flange 2*b*.

The tension of the coil spring 7 increases in response to movement of the flange 2*a* axially and away from the flange 2*b* (i.e. when the flexible element 3 which is trained over the sheave 2 is caused to assume a position at a minimum distance from the common axis of the shaft B and sheave 2. Otherwise stated, the tension of the spring 7 increases in response to a rise in the ratio of the transmission (i.e. to an increase in the RPM of the shaft B relative to the RPM of the shaft A). The coil spring 7 reacts against a cupped member 8 which is rigidly secured to the shaft B, and the spring 7 bears directly upon the axially movable flange 2*a* of the sheave 2.

The primary piston and cylinder assembly 4 operates in parallel with a secondary piston and cylinder assembly, indicated generally at 10, and the primary piston and cylinder assembly 5 operates in parallel with a secondary piston and cylinder assembly, indicated generally at 11. The purpose of the secondary piston and cylinder assemblies 10, 11 is to vary the ratio of the transmission including the sheaves 1, 2 and the flexible element 3. The secondary assembly 10 defines a cylinder chamber 12, and the secondary assembly 11 defines a cylinder chamber 13. The ratio of the transmission is changed in response to admission of pressurized hydraulic fluid into and in response to evacuation of such fluid from the chambers 12 and 13. To this end, the chambers 12, 13 can be connected to a source of pressurized hydraulic fluid (such as a pump) or with one or more fluid evacuating channels, conduits and/or other suitable passages.

If the ratio of the transmission is to be changed, one of the chambers 12 or 13 receives pressurized fluid to increase its volume whereas the contents of the other of these chambers is evacuated, at least in part, to reduce its volume. The means for regulating the admission of fluid into and the evacuation of fluid from the cylinder chambers 12 and 13 includes one or more suitable valves. Suitable valves for this purpose are well known in the prior art and can be used in the infinitely variable transmission of FIG. 1 to regulate the flow of fluid into and from the cylinder chambers 12 and 13.

The power train which is shown in FIG. 1 further comprises a hydromechanical torque monitoring device or sensor, indicated generally at 14, serving to generate a pressure depending upon the magnitude of transmitted torque. In the embodiment which is shown in FIG. 1 and 1A, the torque sensor 14 functions to transmit torque from a driver gear or pinion 15 to the first sheave 1 of the infinitely variable transmission. The driver pinion 15 is mounted on an anti-friction bearing 16 which surrounds the input shaft A. The driver pinion 15 transmits torque to a rotary cam disc 18 of the torque sensor 14 by way of a form-locking connection 17 comprised of a set of mating splines.

The cam disc 18 is held in an axially fixed position by the driver pinion 15 and cooperates with an axially movable second cam disc 19 of the torque sensor 14 by way of a form-locking connection 17 (e.g. a set of mating splines). The cam disk 18 is held in axially fixed position by the driver pinion 15 and cooperates with an axially movable second cam disk 19 of the torque sensor 14. The cam disks 18, 19 have confronting cam faces in the form of ramps, which abut one or more spherical spreading elements 20 between the discs 18, 19. The cam-disc 19 is free to move axially, but cannot rotate relative to the input shaft A. To this end, the cam disc 19 comprises a radially outer portion 19a, which is radially disposed about the shaft A extending axially and away from the spreading elements 20. This outer portion 19a includes a spline 19b in mesh with a mating spline 21a on a member 21, which is mounted on and cannot rotate and/or move axially relative to the shaft A. However, the splines 19b and 21a permit axial movements of the cam disc 19 relative to the member 21 and shaft A.

The component parts of the torque sensor 14 define two plenum chambers 22 and 23. Such component parts can be said to constitute or resemble walls including a cone-shaped member 24 and members 25, 26 which are carried by or form part of the cam disc 19. The members 24, 25 and 26 define the plenum chamber 22. The member 24 is rigidly secured to the shaft A and the illustrated members 25, 26 are shown as separately produced parts (see particularly FIG. 1A) which are non-rotatably affixed to the cam disc 19. The plenum chamber 23 extends radially outwardly beyond and is axially offset relative to the plenum chamber 22. This second plenum chamber 23 is bounded in part by the cone-shaped member 24, by the substantially sleeve-like member 21 which is fixedly connected to the member 24, and by the ring-shaped member 25 which, as already stated above, forms part of or is affixed to the cam disc 19. The latter is movable axially of the shaft A and performs the function of a piston.

The input shaft A is mounted in a housing 30 by way of a needle bearing 27, which is disposed at the left-hand side of the torque sensor 14 as viewed in FIGS. 1 and 1A and by way of a thrust roller bearing 28 and a radial roller bearing 29 disposed at the other side of the adjustable sheave 1 as viewed in FIG. 1. The output shaft B is also mounted in the housing 30 by means of a twin anti-friction rolling bearing 31 at the right-hand side of the assemblies 5 and 11 for the axially movable flange 2a of the sheave 2 on the shaft B, and by means of an anti-friction roller bearing 32 to the left of the sheave 2 as shown in FIG. 1. The twin anti-friction bearing 31 is designed to take up radial stresses as well as two-directional axial stresses. The left-hand axial end of the driven shaft B is provided with a bevel gear 33, which can be moved into mesh with a complementary gear in the differential of a power train of a motor vehicle or with a complementary gear which is operatively connected with the differential (not shown).

In order to generate the pressure which is necessary in order to affect appropriate frictional clamping engagement between the flanges of the sheaves 1, 2 and the flexible element 3, the torque sensor 14 is operatively connected with a source of pressurized hydraulic fluid such as pump 34. The outlet of the pump 34 is connected with the plenum chamber 22 of the torque sensor 14 by a centrally located, axially extending channel 35 and at least one radially extending channel 36 both formed in the driving shaft A. The outlet of the pump 34 is further connected with the cylinder chamber 6 of the hydraulic piston and cylinder assembly 5, which acts upon the axially movable flange 2a of the sheave 2. This connection includes a hydraulic fluid line 37, a centrally located axially extending channel 38 in the driven shaft B, and one or more substantially radially extending channels 39 also formed in the shaft B.

The plenum chamber 22 of the torque sensor 14 is connected with the cylinder chamber 9 of the piston and cylinder assembly 4 for the axially movable flange 1a of the sheave 1 by a channel 40, which is not located in the plane of FIG. 1 or 1A and is indicated by broken lines in these figures. Channel 40 is formed in the ring-shaped member 24, which is affixed to or integrally formed with the driving shaft A. The channel 40 further establishes permanent fluid communication between the plenum chamber 22 of the torque sensor 14 and the cylinder chamber 9 of the piston and cylinder assembly 4 for the flange 1a of the sheave 1.

The driving shaft A is further provided with at least one channel 41 constituting an outlet for the flow of hydraulic fluid from the plenum chamber 22 of the torque sensor 14. The illustrated channel 41 communicates with or can be caused to communicate with the plenum chamber 22 dependent upon the magnitude of transmitted torque. As shown in FIGS. 1 and 1A, the illustrated channel 41 extends substantially radially and communicates with a second centrally located axially extending channel 42 of the driving shaft A. The channel 42 can also be used as a means for conveying hydraulic fluid from the plenum chamber 22 to one or more component parts forming part of the power train including the torque sensor 14 and the transmission including the sheaves 1, 2 and the flexible element 3. For example, the fluid leaving the plenum chamber 22 via channels 41, 42 can be used as a lubricant and/or as a coolant for the component parts of the transmission including the sheaves 1, 2 and the flexible element 3.

The means for regulating the rate of flow of hydraulic fluid from the plenum chamber 22 by way of the channel or outlet 41 includes an inner portion 26a of the cam disc 19. The components are arranged such that the axial position of the cam disc 19 changes in response to changes in the magnitude of transmitted torque such that a portion 26a of the disc 19 moves axially of the shaft A in covering relation to the channel 41 to throttle the flow of fluid from the plenum chamber 22 dependent upon the magnitude of such torque. It can be said that the portion 26a of the cam disc 19 and that portion of the driving shaft A, which defines the channel or outlet 41 constitute a valve and more particularly a throttle valve or flow restrictor for hydraulic fluid leaving the plenum chamber 22 on its way toward one or more component parts, which require cooling and/or lubrication.

Thus, the cam disc 19 functions like a piston that moves axially of the shaft A dependent upon the torque which is being transmitted between the cam discs 18 and 19 causing an increase or a reduction of the rate of fluid flow from the plenum chamber 22 via outlet 41. This results in the establishment, at least in the plenum chamber 22, of a fluid pressure supplied by the pump 34, which is indicative of the magnitude of transmitted torque. Since the plenum chamber 22 is communicatively connected with the cylinder chamber 9 and with the cylinder chamber 6 by means of passages 35 through 39, the fluid pressure in the chambers 6 and 9 is also indicative of the magnitude of transmitted torque.

Since the primary piston and cylinder assemblies 4 and 5 are connected in parallel with the respective secondary piston and cylinder assemblies 10 and 11, the fluid pressure which is supplied for displacement of the axially movable flanges 1a, 2a of the sheaves 1, 2 generates forces which are added to the forces generated as a result of fluid pressure in the cylinder chambers 12 and 13 for the purposes of selecting a desired transmission radio.

The cylinder chamber 12 of the secondary assembly 10 for the axially movable flange 1a of the sheave 1 receives pressurized hydraulic fluid from a discrete source 53 such as a gear pump or a vane pump by way of an axially parallel channel 43 which is formed in the driving shaft A. At least one substantially radially extending bore 44, which is also formed in the shaft A, communicates with the channel 43. A circumferentially extending, peripheral groove 45 formed in the shaft A also communicates with the radially extending bore 44. As shown in FIG. 1, at least one channel 46 is provided in the ring-shaped member 24 and communicates with the groove 45. A substantially radially extending passage 47 formed in the sleeve-like member 21 communicates with the cylinder chamber 12.

The fluid connection between the vane pump 53 and the cylinder chamber 13 of the piston and cylinder assembly 11 for the axially movable flange 2a of the sheave 2 comprises a ring-shaped channel 48 as shown in the lower portion of FIG. 1. Channel 48 formed in the driven shaft B and surrounds the centrally located channel 38, and at least one substantially radially extending channel 49 also formed in the shaft B connects the channel 48 with the chamber 13. A conduit 51 connects the outlet of the pump 53 with the channel 43, and a conduit 52 connects the outlet of the pump 53 with the channel 48. A valve 50 or a system of valves (not shown) controls the flow of pressurized fluid from the pump 53 via conduits 51, 52 and into channels 43, 48 of the shafts A and B respectively.

The pump 53 comprises an optional component part of the power train. If this pump is omitted, the power train comprises a valve 54 shown in FIG. 1 by broken lines or a system of valves (not shown) serving to regulate the flow of pressurized hydraulic fluid from the pump 34 to the conduits 51 and 52. The valve 54 serves to regulate the volumetric flow and/or the pressure of fluid flowing from the pump 34 into the conduits 51 and 52.

The second plenum chamber 23 of the torque sensor 14 is connected in parallel with the first plenum chamber 22, at least when the fluid in the chamber 23 is maintained under pressure. The plenum chamber 23 is sealed off from the pump 34 when the transmission including the sheaves 1, 2 and the flexible element 3 operates in such a way that the rotational speed of the sheave 2 achieves its lowermost) value because the axially movable flanges 1a and 2a then assume the axial positions, which are shown in the upper portions of the respective sheaves in FIG. 1. This is due to the fact that, at such times, the composite path defined by the channels, bores and/or analogous passages 55 through 60 does not permit hydraulic fluid to flow from the pump 34 to the plenum chamber 23.

In such instance the axial position of the flange 1a is positioned in the upper portion of the sheave 1 as shown in FIG. 1, (i.e. the outer end portion of the bore 60 in the driving shaft A is fully exposed) so that the pressure of fluid in the plenum chamber 23 need not exceed atmospheric pressure. The axial force which the torque sensor 14 then transmits for the purposes of torque transmission and which is being applied to the cam disc 19 is taken up only by the cushion of pressurized hydraulic fluid in the plenum chamber 22. The fluid pressure in the plenum chamber 22 increases if the torque to be transmitted by the torque sensor 14 increases. As described hereinabove such pressure is regulated by the throttle valve including that portion 26a of the cam disc 19 and that portion of the driving shaft A which defines the channel or outlet 41.

If the ratio of the transmission is to be increased, the flange 1a of the sheave 1 is moved axially along the driving shaft A in a direction toward the axially fixed flange 1b, and the flange 2a of the sheave 2 is moved axially of the driven shaft B and away from the axially fixed flange 2b. This results in movement of the flange 1a toward or all the way to the position shown in the lower half of the sheave 1 and in the movement of the flange 2a toward or all the way to the position shown in the lower half of the sheave 2 as seen in FIG. 1. Axial movements of the flanges 1a and 2a from the positions shown in the upper halves of the sheaves 1, 2 toward the positions shown in the lower halves of the respective sheaves and increasing the ratio of the infinitely variable transmission are initiated by the valve 50, which is actuated to permit pressurized hydraulic fluid to flow from the pump 53 (or from the pump 34 via valve 54 is the pump 53 is omitted) into the cylinder chamber 12 of the piston and cylinder assembly 10. At the same time fluid is free to flow from the cylinder chamber 13 of the piston and cylinder assembly 11. Thus, the volume of fluid in the chamber 12 increases and the volume of fluid in the chamber 13 decreases.

The component features which enable the flanges 1a, 2a to move axially of shafts A and B, but which prevent these flanges from turning relative to the respective shafts A, B include spline couplings 61 and 62.

The axial position of the flange 1a in which the ratio of the infinitely variable transmission assumes a maximum value is shown by solid lines in the lower half and by phantom lines in the upper half of the sheave 1 as shown in FIG. 1. The corresponding position of the upper portion of the flexible element 3 is shown by phantom lines in the upper half of the sheave 1 as viewed in FIG. 1. The flange 2a assumes the axial position, which is shown by phantom lines in the lower half and by solid lines in the upper half of the sheave 2 (as viewed in FIG. 1) when the ratio of the transmission is set at a minimum value.

The axially movable flange 1a of the sheave 1 includes axially spaced apart centering portions 63, 64, which cooperate with the adjacent portions of the periphery of the driving shaft A, and the axially movable flange 2a of the sheave 2 comprises axially spaced apart centering portions 65, 66 which cooperate with the adjacent portions of the periphery of the driven shaft B. In this configuration the flanges 1a and 2a are movable axially of the respective shafts A and B without any, or without any appreciable radial play.

The centering portions 63, 64 of the flange 1a cooperate with those portions of the shaft A which define the adjacent outer end portions of the channels or bores 59, 60 to form therewith a pair of valves. The flange 1a constitutes the axially movable valving element of each of these valves. If the flange 1a is caused to move from the solid-line position shown in the upper half of the sheave 1 in an axial direction to the right as most clearly shown in FIG. 1A, flange 1a will gradually block the outer end portion of the bore 60 to progressively throttle the flow of hydraulic fluid through such bore. When the flange 1a reaches an axial position in which its centering portion 64 seals the outer end portion of the bore 60, the other centering portion 63 seals the outer end portion of the bore or channel 59.

If the flange 1a is caused to continue its axial movement toward the axially fixed flange 1b, the centering portion 64 continues to seal the outer end of the bore 60, but the centering portion 63 advances beyond and exposes the outer end of the bore 59. This position establishes a gradually increasing connection for the flow of hydraulic fluid between the cylinder chamber 9 of the piston and cylinder assembly 4 and the channel 58 of the shaft A which, in turn, establishes a path for the flow of hydraulic fluid to the plenum chamber 23 through the passages 55, 56 and 57. At such time, the outer end of the bore 60 is at least substantially sealed by the centering portion 64 while the plenum chambers 22, 23 are free to communicate with the cylinder chamber 9. Consequently, the pressure of hydraulic fluid in the plenum chambers 22, 23 matches the fluid pressure in the cylinder chamber 9 and also in the cylinder chamber 6 which is in fluid communication with the pump 34 by the channel 35, by the conduit 37 and by channel 38. The difference, if any, between the fluid pressures in the plenum chambers 22, 23 and cylinder chamber 9 and the cylinder chamber 6 is attributable to losses due to friction between the fluid and the surfaces surrounding the respective paths.

Owing to the establishment of a transmission-ratio-dependent connection between the plenum chambers 22 and 23, the axially effective surface of the pressurized fluid cushion which develops in the torque sensor 14 is increased because the axially effective surfaces in the two plenum chambers 22, 23 are added to (i.e. superimposed upon each other). Such increase of the overall dimensions of the axially effective supporting surface ensures that, if the magnitude of the torque remains unchanged, the pressure which is being built up by the torque sensor 14 is reduced at least substantially proportionally to the increase of the effective surface. This, in turn, means that the pressure of hydraulic fluid in the cylinder chambers 9 and 6 is reduced accordingly. Thus, the torque sensor 14 can be resorted to for transmission-ratio-dependent modulation of fluid pressure in superimposition upon that pressure modulation which is dependent upon the magnitude of transmitted torque. Otherwise stated, the torque sensor 14 permits or renders possible a two-stage modulation of the pressure or pressure level.

In the power train which is shown in FIGS. 1 and 1A, the mutual positions of the bores 59, 60 as well as their positions relative to the centering portions 63, 64 of the axially movable flange 1a are selected in such a way that the switching over from the establishment of fluid pressure only in the plenum chamber 22 to the establishment of fluid pressure in the plenum chambers 22, 23 or vice versa takes place when the ratio of the continuously variable transmission including the sheaves 1, 2 and the flexible element 3 equals or approximates one-to-one. It is advisable to ensure that the shift from the plenum chamber 22 to the combination of plenum chambers 22, 23 or vice versa take place gradually rather than abruptly for structural or constructional reasons. In other words, it is desirable to establish a transition stage during which the bore 60 is already sealed by the axially movable flange 1a while the bore 59 is still sealed from the cylinder chamber 9 of the piston and cylinder assembly 4.

In order to ensure satisfactory operation of the torque sensor 14 and the continuously variable transmission during such transitional stage, the cam disc 19 of the torque sensor 14 must be mounted with freedom of movement in the axial direction of the driving shaft A and the torque sensor comprises means for facilitating a change of the effective volume of the plenum chamber 23. This enables the torque sensor 14 to function like a pump in that its component parts, which can be said to constitute a piston and a cylinder are movable relative to each other.

In the power train of FIGS. 1 and 1A, the compensating means for facilitating a change of the effective volume of the plenum chamber 23 is a so-called tongue or lip seal 67 which is installed in a circumferentially extending annular recess or groove of the ring-shaped member 24 and contacts the adjacent internal cylindrical surface of component 25. In other words, the lip seal 67 functions to seal the plenum chambers 22, 23 from each other.

The illustrated lip seal 67 is designed and placed in such a way that it functions as a check valve that permits fluid to flow in only one axial direction from the plenum chamber 22 into the plenum chamber 23, but prevents the fluid from flowing in the opposite direction. In other words the lip seal 67 prevents an equalization of pressure between the two chambers 22 and 23 whereas a flow through the seal 67 is possible in the other axial direction.

Thus, when the cam disc 19 is caused to move in a direction to the right, as viewed in FIGS. 1 and 1A, and when the plenum chamber 23 is otherwise sealed, fluid can flow from the plenum chamber 23 into the plenum chamber 22. If the cam disc 19 is thereupon caused to move axially in a direction to the left, again as viewed in FIGS. 1 and 1A, the pressure in the plenum chamber 23 can decrease and in some cases air bubbles can form in the oil. However, this will not adversely affect the mode of operation of the torque sensor 14 or the infinitely variable transmission.

The lip seal 67 can be replaced by, or even be utilized in conjunction with, a check valve or one-way valve of any standard or other suitable design. If a standard check valve is used in the power train of FIGS. 1 and 1A, it can be mounted in or on the ring-shaped member 24. In such instance, the illustrated lip seal 67 is or can be replaced with a seal which is effective at all times (i.e. which permits hydraulic fluid from flowing between the plenum chambers 22, 23 in either direction).

Still further, a check valve performing the function of the lip seal 67 can be installed between the channels 35 and 58. All that is required is that the selected check valve or valves permit pressurized hydraulic fluid to flow from the plenum chamber 23 into the plenum chamber 22 but not in the opposite direction.

From the preceding description of the power train it is clear that when the infinitely variable transmission acts as a step-down transmission (i.e. when the transmission can be said to be operating in an underdrive mode), the axial force which is generated by the cams or ramps of the cam discs 18 and 19 is taken up only by the axially effective surface, which develops in the plenum chamber 22. On the other hand, when the transmission acts as step-up transmission (i.e. when the transmission can be said to be operating in an overdrive mode), the axial force which is furnished by the ramps or cams of the cam discs 18, 19 and acts upon the disc 19 is counteracted by axially effective surfaces in both plenum chambers. Thus, and if the input torque does not change, the pressure generated by the torque sensor 14 when the transmission acts as a step-down transmission is higher than the pressure which is generated by the torque sensor 14 when the transmission acts as a step-up transmission.

As described hereinabove, the infinitely variable transmission of FIGS. 1 and 1A is designed in such a way that the switchover point, which causes a connection or separation between the plenum chambers 22, 23 takes place when the transmission ratio is within a range of approximately one-to-one. However, such switchover point can be readily shifted in either direction (i.e. toward a higher or a lower transmission ratio) by the simple expedient of properly dimensioning and/or positioning the bores 59, 60 of the driving shaft A and/or the centering portions 63, 64 which are provided on the axially movable flange 1a to control the flow of hydraulic fluid through the respective bores. The term switchover point is not intended to define a single accurately defined axial position of the flange 1a, but can also embrace a reasonable range of such axial positions.

The connection or separation between the plenum chambers 22 and 23 can also be affected by a special valve designed for this purpose. To this end, the torque sensor 14 can be provided with a channel, which establishes a path for the flow of hydraulic fluid between the plenum chambers 22, 23 and the special valve can be installed in such conduit. The valve need not be actuated directly by the axially movable flange 1a or 2a, but can receive signals for actuation from an externally located energy source. For example, the valve can constitute a hydraulically or pneumatically actuated or an electromagnetic valve, which is actuated in dependency upon the transmission ratio or upon a change of the transmission ratio of the infinitely variable transmission. Highly satisfactory results can be obtained with a so-called 3/2-way valve, which is installed to permit or to interrupt the flow of hydraulic fluid between the plenum chambers 22 and 23. The 3/2-way valve or another suitable valve could be installed in a conduit connecting the channels 35 and 58 of the driving shaft A. This would render it possible to seal or to dispense with the bores 59 and 60 of the shaft A. The valve would have to be installed and designed in such a way that it permits fluid to flow from the plenum chamber 23 when the plenum chambers 22 and 23 are sealed from each other. All that is necessary is to provide a connection for the flow of fluid from the plenum chamber 23 to the oil sump in response to appropriate setting of the valve (i.e. when the latter seals the plenum chambers 22, 23 from each other.

When using a valve which is controlled externally (e.g. electromagnetically), it is possible to change the setting of such valve in response to changes in one or more additional parameters. For example, the valve can be actuated in response to detection of abrupt changes (peaks) of torque being transmitted by the power train. This eliminates, or at least reduces, the likelihood of slip between the flexible element 3 and the flanges of the sheave 1 and/or 2 within certain ranges of operation (e.g. within certain ranges of the ratio of the continuously variable transmission.

FIGS. 1 and 1A show that the torque sensor 14 is installed between the primary power source and the axially movable flange 1a of the sheave 1. However, the torque sensor 14 can be readily adapted or modified for installation at one or more other locations (e.g. on the driven shaft B). For example, a torque sensor (not shown) similar to or practically identical with the torque sensor 14 of FIGS. 1 and 1A can be installed adjacent to and downstream of the axially movable flange 2a of the sheave 2 on the driven shaft B. Further, the power train can employ a plurality of torque sensors (not shown), for example, a first torque sensor on the driving shaft A ahead of the axially movable flange 1a (as seen in the direction of power flow) and a second torque sensor on the driven shaft B downstream of the axially movable flange 2a.

FIG. 1 shows that the cylinder chamber 6 of the piston and cylinder assembly 5 for the flange 2a is connected with the torque sensor 14. However, it is also possible to connect the torque sensor 14 with the cylinder chamber 13 in the piston and cylinder assembly 11 to ensure that the pressure of hydraulic fluid in the cylinder chamber 13 is determined by the torque sensor. The piston and cylinder assembly 5 including the cylinder chamber 6 then forms part of the means for changing the ratio of the continuously variable transmission. All that is necessary in order to carry out the above-outlined modifications or the transmission is to switch the connections for the conduits 37 and 52.

It is presently preferred to mass-produce several component parts of the torque sensor 14 from a suitable metallic sheet material. This also applies for the cam discs 18 and 19. Such parts can be produced in a suitable stamping or embossing machine.

Figure 2:
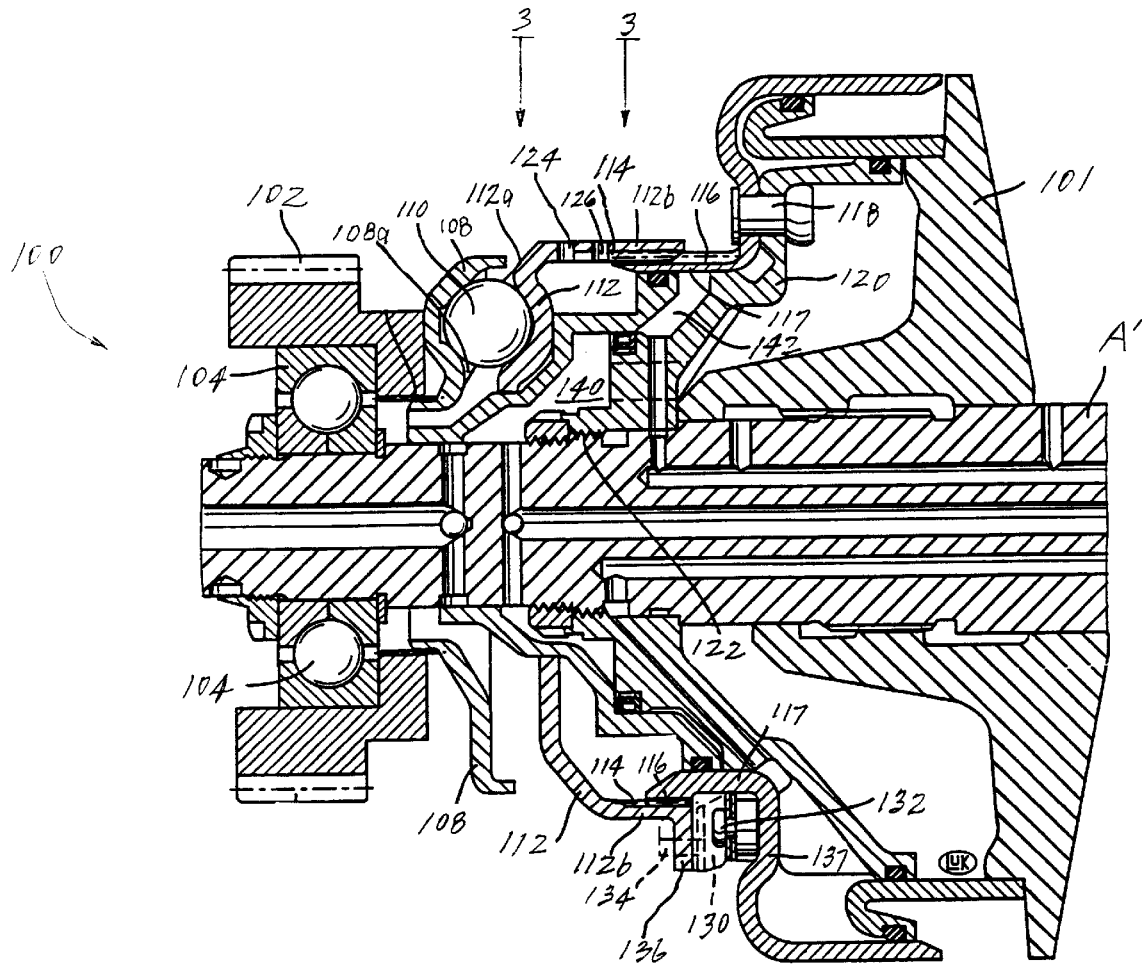
FIG. 2 is a composite axial sectional view of an improved torque monitoring sensor illustrating alternative embodiments of the wear reduction elements of the present invention.

Novel improvements to such a torque sensor in accordance with the present invention will now be described in detail. Referring to FIG. 2, there is shown therein an axial sectional view of a detail of the improved torque sensor, indicated generally at 100, and mounted in operative relation to an axially displaceable flange 101 on the drive shaft A' of a continuously variable transmission. The corresponding axially fixed flange has been omitted from this illustration. It will be noted that FIG. 2 is a composite view which serves to illustrate alternative embodiments of the present wear reduction means in both the upper and lower portions of this figure simultaneously.

The improved torque sensor 100 is comprised of a rotary cam disk 108 fixed to the drive shaft A', a second axially displaceable cam disc 112 mounted on the drive shaft A', and a plurality of spherical spreading elements 110 disposed intermediate the cam discs 108 and 112. The cam discs 108 and 112 have confronting cam faces in the form of ramps 108a and 112a, abutting the spreading elements 110, which are distributed evenly in a circumferential pattern between the ramps 108a and 112a.

The cam disc 108 is held in axially fixed position by the driver pinion 102 and cooperates with the axially moveable second cam disc 112 by way of a form-locking connection 106 (e.g. a set of mating splines). The driver pinion 102 is mounted on an anti-friction bearing 104, which is fixedly secured to the shaft A' as shown.

The axially displaceable cam disc 112 includes a generally cylindrical, radially outer housing section 112b, which extends axially in a direction away from the spreading elements 110 as shown in FIG. 2. This outer housing section 112b of the cam disc 112 includes an internal spline 114 formed on the inner surface thereof, which engages a mating external spline 116 locking the subassembly comprising the ring-shaped component 117 and the disc-shaped component 120 to the drive shaft A' in nonrotatable connection. It will be noted in FIG. 2 that this subassembly 117, 120 comprises a radially outer, ring-shaped component 117 including the external spline 166 formed thereon that is attached by rivets 118 to the disc-shaped component 120, which is nonrotatably connected as at 122 to the drive shaft A'. However, the mating splines 114 and 116 are manufactured with adequate clearance therebetween to permit axial displacement between the cam disc 112 and the subassembly 117, 120.

The hereinabove described components of the torque monitoring sensor 100 define the two plenum chambers 140 and 142 which are well known and described hereinabove with respect to the Prior Art example in FIGS. 1 and 1A.

Because the anti-friction bearing 104 is designed accommodate some tilting movement relative to its axis due to manufacturing tolerances, the driver pinion 102 can be slightly inclined by small angular increments in operation producing a relative movement between the drive shaft A' and the driver pinon 102 with each revolution of the shaft. Such tilting movement is transmitted to the cam disc 108 and to the cam disc 112 through the spreading elements 110 such that in the mating splines 114 and 116, a small relative movement is generated upon each revolution of the driver pinion 102 during operation. Such micro-movements are measurable being in the range of 20–30 microns ($\mu$m) and act to prevent the introduction of lubricating oil into the mating splines 114 and 116 resulting in fretting, corrosion, and premature wear of the mating splines 114 and 116.

In order to compensate for such micro-movements and the resulting frictional wear and corrosion produced thereby, the present torque monitoring sensor 100 includes structures for reducing such detrimental micro-movements. Such structures integrally form, for example, wear reduction means including, but not limited to, those hereinafter described.

Figure 3:
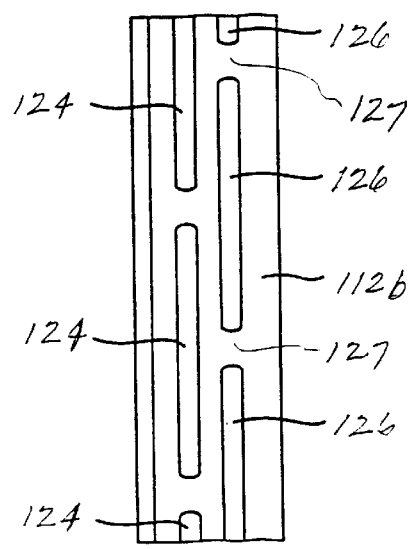
FIG. 3 is a top plan view taken along the line 3—3 of FIG. 2 showing the details of the displaceable cam disk including the wear reduction slots of the present invention.
Figure 4:
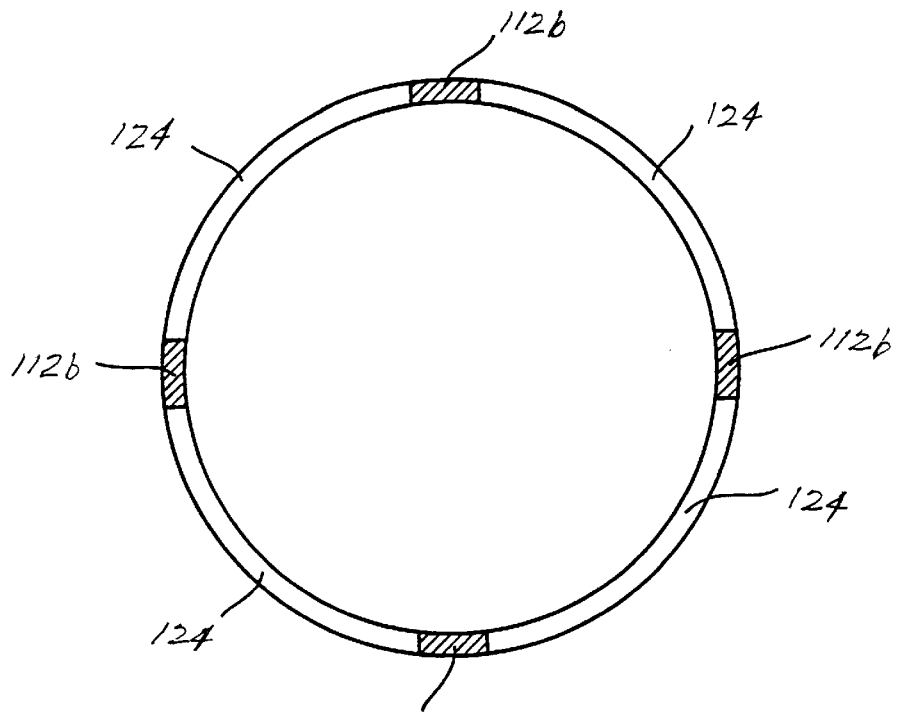
FIG. 4 is an axial section view taken through the displaceable cam disk showing the angular orientation of the wear reduction slots.

In one embodiment a set of elongated wear reduction slots 124 of predetermined dimensions are formed in the cylindrical outer housing section 112b of the cam disc 112 as seen in the upper portion of FIG. 2. The slots 124 are arranged circumferentially about the housing section 112b in end-to-end relation with equal gaps as at 127 therebetween as more clearly shown in FIG. 3. In a preferred embodiment a second set of slots 126 of similar configuration is formed in parallel relation to the slots 124 as seen in FIG. 3 being axially rotated and offset to the slots 124 and symmetrically positioned in relation to the gaps as at 127 between the slots 124. This circumferential arrangement of the slots 124 is further illustrated in axial section in FIG. 4.

The cylindrical housing section 112b of the cam disc 112 including the slots 124 and 126 produces a resilient construction, which extends circumferentially about the section 112b and is capable of flexion and elastic compensation for the micro-movements transmitted to the mating splines 114 and 116 by the tilting movements of the driver pinion 102 described hereinabove. Of course, the significantly larger movements caused by the so-called pumping action of the torque sensor 100 resulting from abrupt changes in torque, which causes cam discs 108 and 112 to be suddenly spread apart by the spherical spreading elements 110, are compensated for by the normal axial movement of the mating splines 114 and 116 during operation.

Referring now to the lower portion of FIG. 2 there is shown therein an alternative embodiment of the present wear reduction means, which functions to absorb the micromovements and/or larger abrupt movements described hereinabove. For this purpose a plurality of leaf spring elements 130 are installed at the juncture of the housing section 112b of the cam disc 112 and the proximate surface of the ring-shaped component 117. The spring elements 130 are generally semicircular in configuration being constructed of a suitable resilient material such as spring steel or other such materials.

In this embodiment the terminal end of the housing section 112b includes an integral perpendicular flange 136 whereon a first end of each spring element 130 is attached by rivets 134 or other fasteners. The respective opposite end of each spring element 130 is similarly attached to the ring-shaped component 117 as at surface 137 by rivets 132 or other fasteners.

Figure 5:
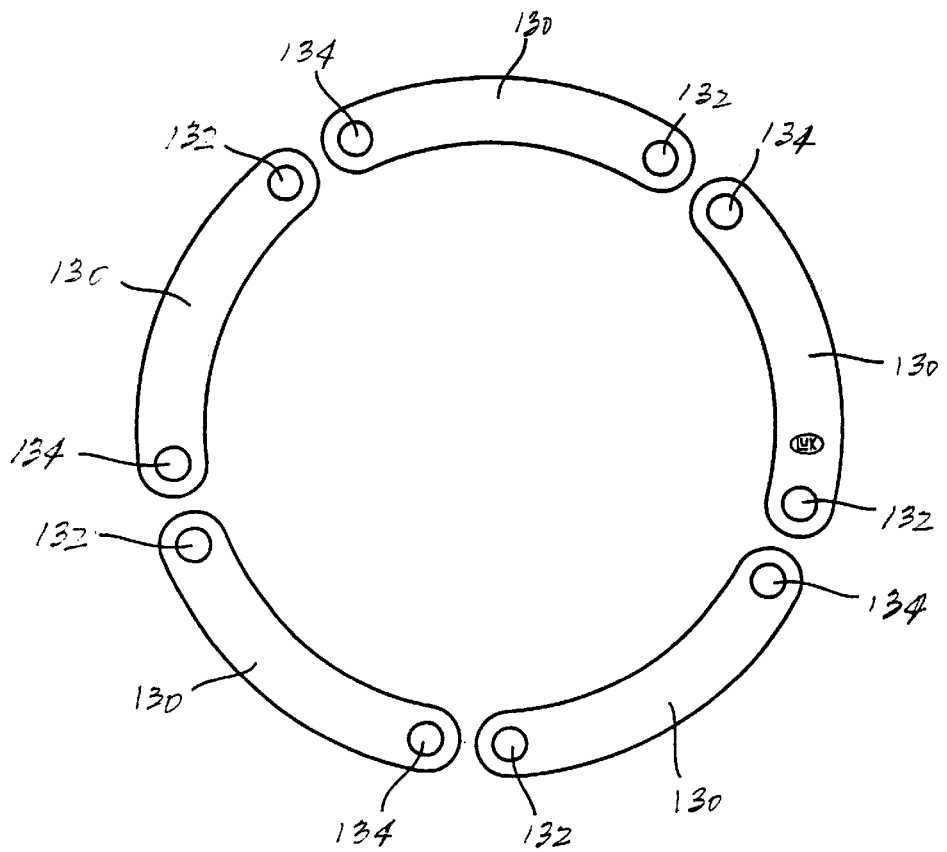
FIG. 5 is an axial section view taken through the juncture of the cam disk and the ring-shaped component showing an alternative embodiment of the wear reduction elements of the present invention including the resilient leaf spring elements.

Advantageously, the leaf spring elements 130 are symmetrically arranged and circumferentially disposed about the flange 136 in the pattern shown in FIG. 5 such that normal axial meshing of the mating splines 114 and 116 is facilitated. The spring tension exerted by the leaf springs 130 can be taken into account and adjusted for a given application.

By the application of the leaf springs 130 as described hereinabove, abrupt changes in the transmission of torque and the resulting transfer of micro-movements to coaxial components such as the mating splines 114 and 116 is significantly reduced. Thus, the present torque sensor 100 is nearly free of hysteresis associated with the severe physical strains, axial thrust forces, and added mechanical friction, which can cause premature wear and mechanical failure of the components of the torque monitoring sensor 100.

It will be appreciated by those skilled in the art that alternative embodiments of the spring elements can be devised in lieu of the leaf spring elements 130. For example, axially activated helical springs (not shown), which can be positioned in corresponding coaxial indentations (not shown) formed in the flange 136 and the proximate surface as at 137 of the component 117, will function for this purpose.

Although not specifically illustrated in the drawings, it should be understood that additional equipment and structural components will be provided as necessary and that all of the components above are arranged and supported in an appropriate fashion to form a complete and operative transmission incorporating features of the present invention.

It is also understood that variations may be made in the present invention without departing from the scope of the invention. Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. An improved torque monitoring sensor for an infinitely variable transmission, said torque monitoring sensor including a rotary cam disc and an axially displaceable cam disc having a substantially cylindrical housing, said cam discs having confronting cam surfaces bearing upon spherical spreading elements retained therebetween, said cam discs being urged against each other with a force depending upon the transmitted torque, said cam discs functioning to mechanically transmit at least a portion of said torque to meter the flow of hydraulic fluid output from a plenum chamber within said torque monitoring sensor to provide frictional clamping engagement between axially adjustable sheaves and an endless flexible element of said transmission, said improvements comprising:

wear reducing means integrally formed in said cam disc housing such that micro-movements generated by said torque sensor are resiliently absorbed by elastic deformation of said cam disc housing reducing mechanical transference of said micro-movements to mating components thereof whereby frictional wear and corrosion of such mating components is minimized.

2. The improved torque monitoring sensor of claim 1 wherein said wear reducing means includes a plurality of elongated slots formed in said cam disc housing to enable elastic deformation of said housing during operation of said torque monitoring sensor.

3. The improved torque monitoring sensor of claim 2 wherein said slots are arranged in parallel, circumferential rows evenly distributed about said housing, each of said slots being equal in length and arranged in end-to-end relation with regular gaps therebetween.

4. The improved torque monitoring sensor of claim 3 wherein each of said rows is axially rotated with respect to another to provide a symmetrical pattern wherein each of said slots is axially aligned with one of said regular gaps in an adjacent row of said slots.

5. An improved torque monitoring sensor for an infinitely variable transmission, said torque monitoring sensor including a rotary cam disc and an axially displaceable cam disc having a substantially cylindrical housing with a circumferential flange formed thereon, said cam discs having confronting cam surfaces bearing upon spherical spreading elements retained therebetween, said cam discs being urged against each other with a force depending upon the transmitted torque, said cam discs functioning to mechanically transmit at least a portion of said torque to meter the flow of hydraulic fluid output from a plenum chamber within said torque monitoring sensor to provide frictional clamping engagement between axially adjustable sheaves and an endless flexible element of said transmission, said improvements comprising:

wear reducing means including spring elements disposed between said flange formed on said cam disc housing and a mating ring-shaped component disposed in operative relation to said flange such that micro-movements generated by said torque monitoring senor are resiliently absorbed by elastic deformation of said spring elements reducing mechanical transference of said micro-movements to said ring-shaped component whereby frictional wear and corrosion of such mating components is minimized.

6. The improved torque monitoring sensor of claim 5 wherein said spring elements are semicircular leaf springs.

7. The improved torque monitoring sensor of claim 6 wherein said leaf springs are attached at a first end thereof to said flange and at a second end thereof to said ring-shaped component by suitable attaching hardware.

8. The improved torque monitoring sensor of claim 5 wherein said micro-movements are in the range of 20 to 30 microns ($\mu$m).

9. An improved infinitely variable transmission for transmitting torque from a rotary output element of a power source to a rotary driven element of said transmission, said transmission including a torque monitoring sensor comprised of a rotary cam disc, an axially displaceable cam disc having a substantially cylindrical housing and spherical spreading elements retained therebetween, said cam discs being urged against each other with a force depending upon the transmitted torque, said transmission further including a housing, a driven shaft mounted within said housing, a first sheave assembly including hydraulic actuating means mounted on said driven shaft and having a first and second end, an output shaft rotatably mounted within said housing in operative relation to said driven shaft, a second sheave assembly including hydraulic actuating means mounted on said output shaft and having a first and second end, and an endless flexible element trained over said first and second sheave assemblies to establish frictional engagement therebetween, said improvements comprising:

wear reducing means integrally formed in said cam disc housing such that micro-movements generated by said torque sensor are resiliently absorbed by elastic deformation of said cam disc housing reducing mechanical transference of said micro-movements to mating components thereof whereby frictional wear and corrosion of such mating components is minimized.

10. The improved infinitely variable transmission of claim 9 wherein said wear reduction means further includes a plurality of elongated slots formed in said cylindrical housing of said cam disc to enable flexion of said housing during operation of said torque monitoring sensor.

11. The improved infinitely variable transmission of claim 10 wherein said slots are arranged in parallel, circumferential rows about said housing, each of said slots being equal in length and arranged in end-to-end relation with regular gaps therebetween.

12. The improved infinitely variable transmission of claim 11 wherein each of said rows is axially rotated with respect to another to provide a symmetrical pattern wherein each of said slots is axially aligned with one of said regular gaps in an adjacent row.

13. The improved infinitely variable transmission of claim 9 wherein said micro-movements are in the range of 20 to 30 microns ($\mu$m).

14. An improved infinitely variable transmission for transmitting torque from a rotary input element of a power source to a rotary driven element of said transmission, said transmission including a torque monitoring sensor comprised of a rotary cam disc, an axially displaceable cam disc having a substantially cylindrical housing with a circumferential flange formed thereon, and spherical spreading elements retained therebetween, said cam discs being urged against each other with a force depending upon the transmitted torque, said transmission further including a housing, a driven shaft mounted within said housing, a first sheave assembly including hydraulic actuating means mounted on said driven shaft and having a first and second end, an output shaft rotatably mounted within said housing in operative relation to said driven shaft, a second sheave assembly including hydraulic actuating means mounted on said output shaft and actuating means mounted on said output shaft and having a first and second end, and an endless flexible element trained over said first and second sheave assemblies to establish frictional engagement therebetween, said improvements comprising:

wear reducing means including spring elements disposed between said flange formed on said cam disc housing and a mating ring-shaped component disposed in operative relation to said flange such that micro-movements generated by said torque monitoring sensor are resiliently absorbed by elastic deformation of said spring elements reducing mechanical transference of said micro-movements to said ring-shaped component whereby frictional wear and corrosion of such mating components is minimized.

15. The improved infinitely variable transmission of claim 14 wherein said spring elements are semicircular leaf springs.

16. The improved infinitely variable transmission of claim 15 wherein said leaf springs are attached at a first end thereof to said flange and at a second end thereof to said ring-shaped component by suitable attaching hardware.

17. The improved infinitely variable transmission of claim 14 wherein said micro-movements are in the range of 20 to 30 microns ($\mu$m).

* * * * *